3,140,290
N-(α-HYDROXY-β-TRICHLOROETHYL)-5,5-DI-PHENYL-TETRAHYDROGLYOXALINE-4-ONE
Victor Lafon, Paris, France, assignor to Societe Anonyme dite: Orsymonde, Paris, France, a French society
No Drawing. Filed Apr. 23, 1962, Ser. No. 189,326
Claims priority, application Great Britain Apr. 24, 1961
1 Claim. (Cl. 260—309.7)

The present invention relates to the novel compound of the formula:

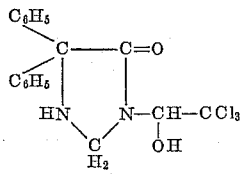

namely, N-(alpha-hydroxy-beta-trichloroethyl)-5,5-diphenyltetrahydroglyoxaline-4-one.

According to the invention, this compound is prepared by the condensation of 5,5-diphenyltetrahydroglyoxaline-4-one and chloral.

Several preparations of this compound have been carried out; the parts by weight of the compounds taking part in the reaction are indicated below.

In a first method, 800 parts of chloral were slowly added, with agitation, to a solution of 420 parts of 5,5-diphenyltetrahydroglyoxaline-4-one in 450 parts of dioxane; this solution had previously been prepared hot and, during the addition of the chloral, it was cooled externally, in order to keep the temperature from exceeding 28° C.

The reaction mixture was allowed to stand at the ambient temperature and crystals separated; these were washed with cold distilled water.

The mother liquor can be concentrated under vacuum, in order to obtain another crystallised fraction.

In a second method, 850 parts of 5,5-diphenyltetrahydroglyoxaline-4-one and 1000 parts of chloral were first added together and there were then added to this mixture, with agitation, 1470 parts of chloral at the ambient temperature; agitation was continued for 90 mins. at a temperature of the order of 60° to 70° C.

After allowing the mixture to stand at the ambient temperature for 48 hours, crystals were obtained which were filtered under vacuum and washed with water. After vacuum distillation, the mother liquor yielded another crystallised fraction.

In a third method, a solution of 1650 parts of chloral hydrate in 3000 parts of dioxane was used, to which a mixture of 850 parts of 5,5-diphenyltetrahydroglyoxaline-4-one and 1000 parts of dioxane was added.

The mixture was heated to boiling and the vapour formed during the reaction was separated by distillation.

By cooling, a crystalline substance was obtained, which was filtered off. After vacuum distillation, the mother liquor yielded another crystalline fraction.

In the three methods, a product is obtained having the same degree of purity and in very similar yields, of the order of 48%. This product has the form of a yellowish-white powder, melting at 138° C. after purification with 50% alcohol.

In an improved method of preparation of the compound, use has been made of:

Chloral hydrate _____ g__ 115
5,5-diphenyltetrahydroglyoxaline-4-one _____ g__ 50
Dioxane _____ ccs__ 20

The 5,5-diphenyltetrahydroglyoxaline-4-one moistened with the dioxane was introduced into an Erlenmeyer flask, the crystals of chloral hydrate were added and the mixture was gently heated while agitating vigorously. The molten chloral hydrate served as a solvent for the glyoxaline derivative. It is advisable not to take the mixture to boiling because the solution becomes yellowish and the product will be less pure and slightly yellow coloured. The solution is filtered hot and allowed to cool. The compound precipitates very rapidly.

In this last method of preparation, 10 to 25 ccs. of dioxane can be used.

In the last method, a yield of 80% of a product having a melting point on the Maquenne block of 148° C. is obtained.

This product is soluble in the hot in acetone, soluble in alcohol and benzene, soluble in the hot in 50% alcohol and reprecipitates in the cold from this solvent, and is insoluble in water.

Pharmacodynamic studies of this product have been made and it has been determined that it is very slightly toxic, that it is not hypnotic, antalgic or anti-convulsant, but that on the contrary it is ataraxic.

In mice, doses up to 2 g./kg. administered intraperitoneally cause no loss of reflex action. It thus has no hypnotic effect or toxicity. In mice, doses of 1 to 3 g./kg. administered orally have shown only a very low toxicity (⅙ of the animals).

The compound has practically no analgesic effect, even in doses of 1 to 2 g./kg. administered intraperitoneally. It has virtually no effect upon the behaviour of the animals; doses of 125 to 200 mg./kg. given intraperitoneally and of 1 to 3 g./kg. given orally cause no loss of reflex in mice (return reflex and external auditory conduit reflex).

The compound has virtually no anticonvulsive action. It does not protect the mice against the convulsive effect of pentamethylene tetrazol or of strychnine, but it partly protects them against the toxic action of these materials.

To determine the ataraxic effect, several tests have been used.

On spontaneous motility of mice, evaluated by the Winter and Flataker test, it has been observed that doses of 500 mg./kg. administered intraperitoneally diminish the motility by 94%; this maximum effect is also observed for the higher doses of 0.750 and 2 g./kg.; a group of controls which had received physiological serum had their motility increased during the same time.

In the "rotarod" test, it has been shown that, in 18 groups each of 6 mice, all the animals stayed on a rotating rod for 2 mins. 8 to 10% of the animals did not stay on for 2 mins. after receiving doses of 500 to 700 mg./kg. of the product intraperitoneally; an effect of the same order is observed with animals which had absorbed 2.5 to 5 mg./kg. of chlorpromazine intraperitoneally.

Doses of 1 g./kg. affect 20% of the animals which approximately corresponds to an effect similar to that of 7.5 mg./kg. of chlorpromazine. Doses of 2 g./kg. affect 70% of the animals, which approximately corresponds to a dose of 10 mg./kg. of chlorpromazine.

In a third test, the potentialisation of the hypnotic effect of hexobarbital was examined. On twelve groups, each of 6 mice (Webster strain, weights from 18 to 21 g.), a dose of 100 mg./kg. of hexobarbital administered intraperitoneally caused an average duration of sleep of one hour.

This duration exceeds 160 minutes for mice which have received 5 mg./kg. of chlorpromazine administered orally. It is also increased when the compound is administered gastrically 30 minutes before the administration of hexobarbital. Doses of 250 and 500 mg./kg. of the compound increase the duration of sedation to a value between 320 and 440 minutes according to the particular case. A dose of 2 g./kg. increases the duration of sedation to a value between 430 and 1210 minutes and a dose of 125 mg./kg. increases the duration of sedation to a value between 250 and 380 minutes.

In a fourth test, the method of Burn and Hobbs was utilized based upon the protective effect as regards mortal cortical stimulation exerted by d-amphetamine on groups of mice maintained at a temperature of 26° C. The tests were carried out on groups each of 10 animals.

Although a group of controls had a mortality of 80% after injection of d-amphetamine, the previous subcutaneous administration of 1 mg./kg. of chlorpromazine produced a protection of 50% of the animals. Gastric administration of 500 mg./kg. of the compound produced a protection of 30%.

Study has also been made of the cataleptic activity of the compound. In the rat, the test of De Jong and Baru has been used, namely, the catatonic syndrome characterised by fixity and acidity. In the first case, the rat resting upon a table remains fixed in the state in which it is placed and, in the second case, it loses the possibility of spontaneously moving.

The tests have been carried out on 4 groups of 6 male rats of the Wistar strain, having weights ranging from 135 to 160 grams.

The tests have been carried out with the standard ataraxics, chlorpromazine and prochlorperazine.

In a dose of 2 mg./kg. injected subcutaneously, chlorpromazine is without cataleptic effect. On the other hand, a dose of 15 mg./kg. of prochlorperazine also injected subcutaneously exerts a cataleptic activity or fixity and passivity in 3/6 of the rats.

The compound in doses of 1 to 2 g./kg. does not exert any cataleptic phenomenon of either fixity or passivity.

It appears from the above tests that the compound exerts a specific central depressive action. It does not produce any loss of posture reflex at any dosage. It is thus not a hypnotic. It does not exert any muscular relaxive action of central origin. On the other hand, in various tests it exerts the characteristic effect of ataraxics.

Thus the compound can be classified among the sedative ataraxics and not among the cataleptic ataraxics.

The antiserotonine effect of the compound has been studied by determining its antagonism towards 5-hydroxytryptamine in vitro and in vivo.

The method of Gaddum and Picarelli has been used, in which a guinea-pig ileum is maintained alive in special Tyrode solution at a temperature of 35° C. Contraction of the organ was obtained by utilising doses of 10 to 20γ of 5-hydroxytryptamine hydrochloride/60 ccs. of Tyrode.

The antiserotonine effect of the compound has been determined on 4 organs. The results are concordant, a dose of 1 mg./60 ccs. of Tyrode bath diminishing by 40% the contractive effect of serotonine. A dose of 2 mg. diminishes this effect by 60%.

The antiserotonine effect of the compound has been confirmed by utilising two in vivo methods:

In mice, the laxative effect has been studied by utilising the Wooley method, which consists of administering a 5-hydroxytryptamine precursor (5-hydroxytryptophane) which, when injected intraperitoneally in doses of 1 mg./kg. in solution in Ringer liquid, does or does not produce a defecation in the ½ hour following the injection. The laxative effect is characterised by fluidity of the stools, determined by the appearance of a coloured area on the reverse of a porous paper placed under the cage.

The compound injected at a dose of 50 mg./kg. protects 37.5% of the mice vis-a-vis the laxative effect of serotonine. On 8 control animals, no protection was observed when the same volume of Ringer liquid was injected exclusively.

The effect on carotid pressure has also been studied.

In the chloralosed dog, where the precaution was taken of waiting for the antiserotonine effect of the chloralose to be eliminated by a rest period of 2 hours, the effect of serotonine injected intravenously in a dose of 60γ was determined before and after injection of the antiserotonine. The method of encasement was utilised to ensure return to the normal of the effect of the serotonine. The hypertensive peak was measured and the area of observation.

Tests have been carried out on a male dog having a weight of 24 kg. A dose of 30 mg./kg. of the compound given intravenously diminishes the serotonine effect by 25%.

It is known that various ataraxics, particularly chlorpromazine, are accompanied by secondary effects. It thus appeared interesting to study whether the compound exerts similar actions. This study was carried out on the cardiovascular system, in particular on the peripheral sympathetic system and the vasomotor reflexes, and finally on free nerve tissues. The effect on free tissue concerns modification of the response to various muscular and cholinergic agents.

The tensive effects and action on the heart have also been studied. This study was carried out on two species of animals, the dog and the cat. It is known that cats have greater sensitivity to the hypotensive action of chlorpromazine.

Study of the carotid pressure recorded by means of a Ludwig manometer was effected on a cat anaesthetised with Nembutal and on a dog anaesthetised with chloralose.

In the cat, intravenous injection of 2 mg./kg. of the compound produced a hypotension of short duration. This effect gives rise to tachyphylaxic phenomena. Subsequent injection of doses 5 times greater administered intravenously is without effect.

On 3 male mongrel dogs of weights of 21 to 23 kg. anaesthetised with chloralose, intravenous injection of 2 mg./kg. of the compound exerts a weak transistory hypotension. If a dose of 10 mg./kg. is injected subsequently, no hypotensive effect is observed.

The cardiac effect has been studied in the cat by utilising the suspension method. Administration of 2 mg./kg. of the product causes diminution of the overall auricular amplitude. This is of very short duration, however. Also, subsequent injection of a higher dose causes no effect.

On the sympathetic system, the peripheral action and the action of the vasomotor reflexes have been studied successively.

Study of the peripheral effect has been carried out on three chloralosed dogs and a cat anaesthetised with Nembutal, on which the effect of adrenalin on the carotid pressure has been recorded.

The compound in doses of 2, 10 and even 30 mg./kg. exerts no antagonistic effect to the hypertensive effect of adrenalin. It is known, on the other hand, that chlorpromazine exerts an adrenolytic effect. These results have been confirmed by the effect on the respiration. This also applies to the effect on peristalsis in the dog.

As regards neurogenic hypertension obtained by bilateral occlusion of the carotids, the compound has proved to have weak inhibitive effects in a dose of 30 mg./kg. administered intravenously.

Study of the action of the compound on free tissue has been effected in vitro. Rat duodenum was used and, the effect was studied, on the one hand, of a muscular poison, barium chloride, and, on the other hand, of a spasmogenic agent, acetylcholine.

The tests were carried out on a rat duodenum maintained alive by the Magnus method and immersed in Tyrode liquid heated to a temperature of 33° C.

As the musculotropic spasmogenic agent, barium chloride (0.2 mg./cc.) was used. As the cholinergic agent, acetylcholine in a concentration of 0.1 to 0.2γ/cc. was used.

As a reference sample, papaverine was used for the musculotropic effect and atropine for the neurotropic effect.

The compound in a dose of 0.4 mg./cc. exerts a musculotropic antispasmodic action comparable to that of 2γ of papaverine, the antispasmodic action being measured by a reduction by 50% of the initial contraction.

The antispasmodic neurotropic effect of the composition is 10,000 times less than that of atropine.

It is known that chlorpromazine exerts only a very weak antihistamine action and, in contrast, promethazine is a powerful antihistamine agent.

The antihistamine effect of the compound has been studied both in vivo and in vitro.

In vivo tests have been effected on two chloralosed dogs on which, after determining the constancy of the effects of a dose of histamine (8γ/kg.), the effects of the same dose of the same agent after injection of the compound have been studied.

Even in a dose of 30 mg./kg. given intravenously to the dog, the compound does not modify the hypotensive effect of histamine.

In vitro, the technique of Magnus has been used on guinea-pig ileum maintained alive at a temperature of 35° C.

The tests have been carried out on three organs.

The contractive effect of 5γ/cc. of histamine has been studied before and after injection into the bath of the compound in extremely variable doses increasing from 10 to 100 mg./cc. The product was maintained in contact with the organs for 5 minutes before administration of the histamine.

In no case, even at very high doses of 100 mg./60 cc., was any antihistamine effect observed.

This study has shown also that the compound is a sedative, non-cataleptic ataraxic and has no secondary effects.

This results from the combination of an anti-epileptic and a hypnotic, chloral.

The anti-epileptic (5,5-diphenyltetrahydroglyoxaline-4-one) has well-known anti-epileptic properties. As to chloral, Ore in 1875 employed it for the first time in general anaesthesia by intravenous injection.

The compound does not have any of the principal properties of its constituents. It is less toxic in mice than the anti-epileptic. For the latter, the anticonvulsive action (vis-a-vis Metrazol) is already modified for 50 mg./kg. given intraperitoneally in mice, while 1 g./kg. of the compound does not protect the mice. On the other hand, the compound gives protection to a certain extent against the toxic effects of Metrazol.

Finally, there remain the sedative properties of the ataraxic type and, also, the antiserotonine properties are of interest.

Clinical study in man using a posology of 3 to 6 doses of 0.10 g. per 24 hours has shown that the compound is a minor non-hypnotic tranquilizer.

The compound can be utilised in the following forms:

|     |     | G. |
| --- | --- | --- |
| (1) | Compound | 0.10 |
|     | Lactose q.s. for one 0.20 g. cachet. | |
| (2) | Compound | 0.10 |
|     | Excipient q.s. for one 0.46 g. tablet. | |
| (3) | Compound | 0.20 |
|     | For one capsule. | |

Following the tests summarised above, particularly those concerning the potentialisation of the hypnotic effect of hexobarbital, tests have been carried out to show in a clear manner the interest in combining the compound with butobarbital.

The hypnotic effect of compositions containing the compound and butobarbital has been studied.

The method followed consists in determining the hypnotic effect in mice utilising the standard test, namely loss of the return reflex.

This reflex was considered to be positive if the mouse, placed in dorsal decubitus, is incapable of regaining its feet in 10 seconds.

The first series of experiments consisted in utilising intraperitoneal administration, the absorption being more constant than by the gastric method.

Female mice of the Webster strain of weights ranging from 18 to 25 g. were used. Each test and each dose were utilised on 12 mice. The compound was administered in a sticky suspension in order always to inject the same volume, 0.2 cc./10 g. per mouse.

Comparison was made at a predetermined dose of butobarbital, the pharmaceutical compositions comprising various doses and various proportions of the compound. Composition comprising 100 mg. of butobarbital:

A dose of 100 mg./kg. of the compound considerably increased the sedation (about 300 minutes).

Composition comprising 80 mg./kg. of butobarbital:

The addition of 100 mg. of the compound reinforced the barbituric sedation in 10/12 of the animals for 1 hour. A dose of 200 mg./kg. of the compound also reinforced the barbituric sedation (the sedation lasting 2 hours for 10/12 of the animals).

Other tests have confirmed the interest in the association of butobarbital with the compound for doses of 100 to 150 mg./kg. of butobarbital and for ratios of 1:1 to 1:3 of butobarbital to the compound.

The average efficacious dose in these ranges is from 1.5 to 2 times less for the compositions (thus an efficiency of 1.5 to two times greater) than for butobarbital alone.

Clinical tests of butobarbital/compound compositions have given excellent results: no anorectic irritation with the suppository form, no complaints on the part of the patients, correct quality of sedation, no malaise on awakening, as far as the patients are concerned superiority over butobarbital and placebos.

Pharmaceutical compositions can be selected from among the following:

|     |     | G. |
| --- | --- | --- |
| (1) | Compound | 0.10 |
|     | Butobarbital | 0.10 |
|     | Q.s. for a cachet or a capsule. | |
| (2) | Compound | 0.10 |
|     | Butobarbital | 0.15 |
|     | Excipient q.s. for a tablet. | |
| (3) | Compound | 0.20 |
|     | Butobarbital | 0.20 |
|     | Cocoa butter q.s. for a suppository. | |
| (4) | Compound | 0.20 |
|     | Butobarbital | 0.142 |
|     | Excipient q.s. for a suppository. | |
| (5) | Compound | 0.20 |
|     | Butobarbital | 0.166 |
|     | Excipient q.s. for a suppository. | |

I claim:

The compound

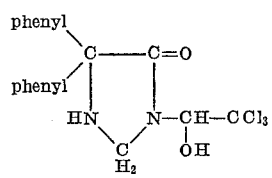

(References on following page)

References Cited in the file of this patent

UNITED STATES PATENTS

| | | |
|---|---|---|
| 2,370,839 | Burke et al. | Mar. 6, 1945 |
| 2,468,593 | Dorman | Apr. 26, 1949 |
| 2,777,857 | Konig | Jan. 15, 1957 |
| 2,842,553 | Christian | July 8, 1958 |
| 2,854,379 | Fancher | Sept. 30, 1958 |
| 2,887,485 | Yost | May 19, 1959 |
| 2,922,744 | Mills | Jan. 26, 1960 |
| 2,981,739 | Bimber | Apr. 25, 1961 |
| 3,014,042 | Mantz | Dec. 19, 1961 |

FOREIGN PATENTS

| | | |
|---|---|---|
| 577,735 | Great Britain | May 29, 1946 |

OTHER REFERENCES

Coppin et al.: Jour. Chem. Soc. (London), vol. 105, pages 32–36 (1914).

Chattaway et al.: Proc. Roy. Soc. London, Series A, vol. 134, pages 372–84 (1931).